May 3, 1932.    H. C. FORD ET AL    1,856,094
AIRPLANE
Filed May 26, 1931
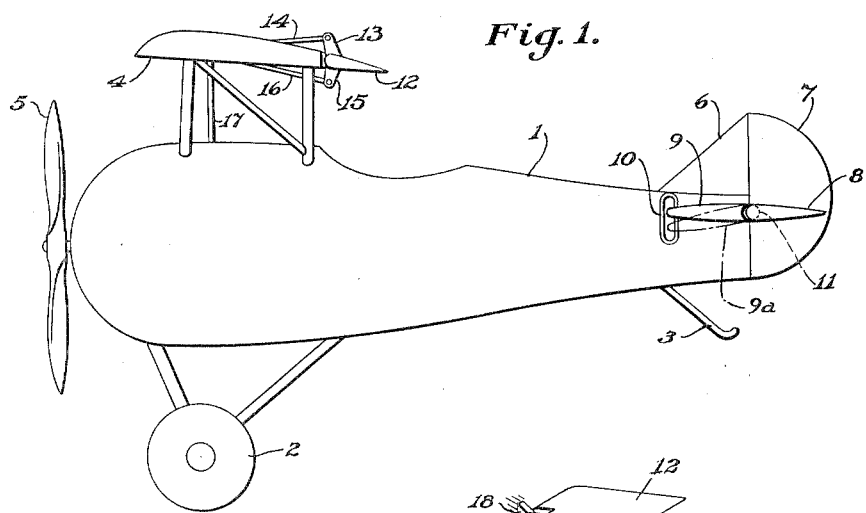
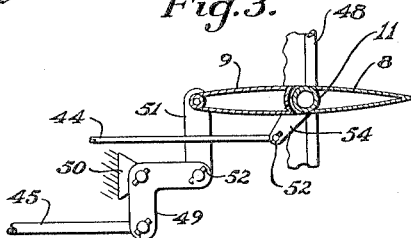
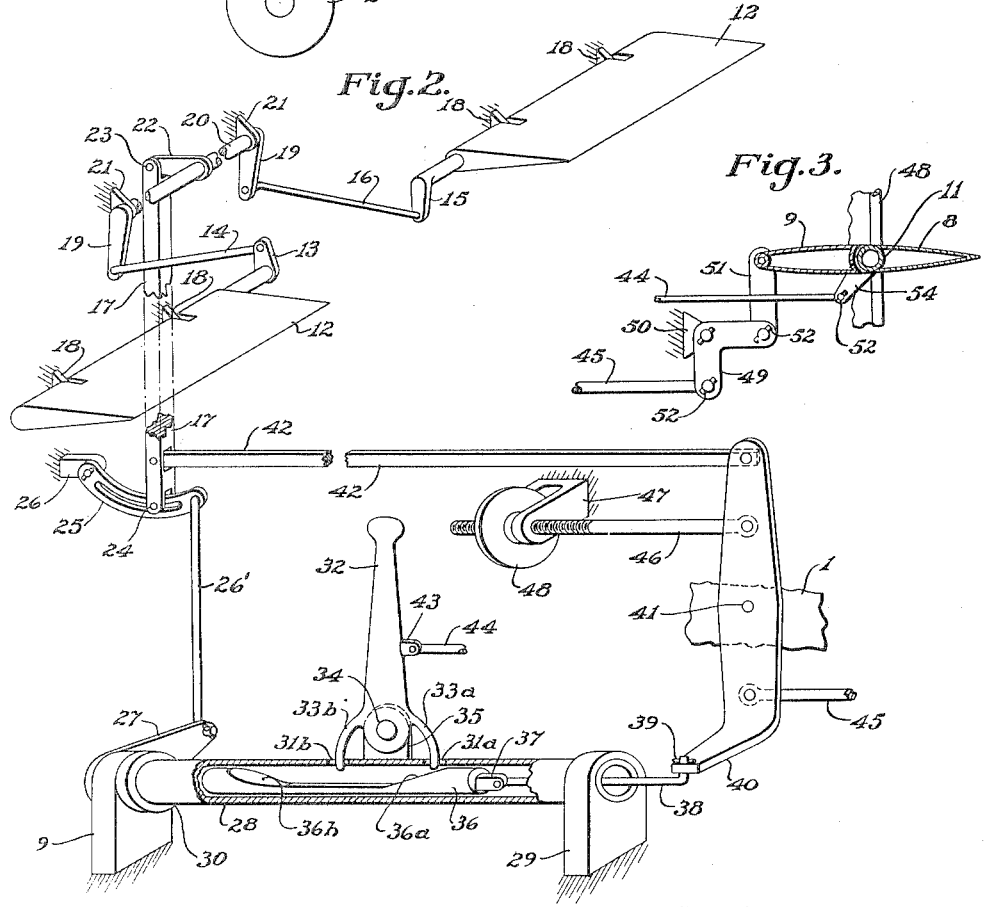
Inventors
HANNIBAL C. FORD
JOHN McK. BALLOU
VERNON W. BALZER
By their Attorneys
Mosley and Gill Patented May 3, 1932

1,856,094

UNITED STATES PATENT OFFICE

HANNIBAL C. FORD, OF JAMAICA, AND JOHN McK. BALLOU AND VERNON W. BALZER, OF FOREST HILLS, NEW YORK, ASSIGNORS TO MERRILL AIRCRAFT COMPANY, OF DOVER, DELAWARE, A CORPORATION OF DELAWARE

AIRPLANE

Application filed May 26, 1931. Serial No. 540,018.

This invention relates to airplanes in general and in particular to the control systems therefor.

An object of this invention is to provide an airplane control system with an adjustable stabilizer and with a roll control system, the two being interconnected to grade the extent of the roll control by the position of adjustment of the stabilizer.

Another object is to provide an airplane having an adjustable stabilizer and an elevator with stops for the elevator actuating mechanism, graded in their positions of adjustment by adjustments of the stabilizer.

Other objects will appear in the ensuing description and claims.

In the well known current control systems for airplanes, a serious defect resides in the constancy of the angular displacements of the roll control surfaces for equal hand movements of the stick, or Deperdussin wheel or equivalent, regardless of the flight condition of the airplane. When the airplane is travelling slowly, particularly when about to land, the effectiveness of the roll or lateral control should be at its maximum to permit of quick maneuverability in avoiding obstacles or correcting for varying wind conditions. When the airplane is travelling fast, the effectiveness of the roll control system should be a minimum, as, in the first place there is never any occasion for rapid lateral rotational movements, and in the second place, excessive control in this condition of flight causes excessive stresses in the structure of the airplane, which may result in structural failure with consequent disaster. In addition to this, if the airplane is travelling at its maximum speed for level flight, it follows that the wings must be at or near their stalling angle, at which point trailing edge ailerons, or differential movements of the wings such as warping tips are well known to be least effective in inducing rolling moments, whereas in the high speed condition the wings are of necessity in their low angle condition, and the above enumerated roll control means are well known to be most effective.

In like manner, excessive diving control is a source of danger when travelling fast, for the wings are of necessity near their angle of attack of zero lift, and but little control might enable the pilot to dive disastrously. At the other end of the angle of attack range, similarly, excessive stalling control enables the pilot to stall the airplane, which might result in a spin or whipstall, both being sources of danger.

The present invention overcomes these defects by making the extent of the longitudinal and lateral controls dependent upon the position of adjustment of the horizontal stabilizer. When the stabilizer is adjusted for the airplane to trim at its low speed, or high angle of attack condition, a graded stop prevents stalling control by the use of the elevator, while permitting free use of diving control by the use of the elevator. In addition, when in this flight condition, a variable ratio device in the roll control system is brought to its maximum ratio position, allowing of full and unrestricted angular movements of the roll control surfaces; whereas, when the stabilizer is adjusted to trim the airplane at its high speed, or low angle of attack condition, a graded stop prevents diving control by the use of the elevator, while permitting free use of stalling control; and likewise, in addition, when this flight condition prevails, the said variable ratio device is brought to its minimum ratio position, restricting the extent of angular movements of the roll control surfaces. Since the adjustment of the horizontal stabilizer necessarily results in a change in speed of the airplane, the device for adjusting the stabilizer may be considered as a speed adjusting means for the airplane.

The operation of a preferred form of the present invention is elucidated in the following drawings and description, wherein Fig. 1 is a side elevation of an airplane embodying this invention, Fig. 2 is a perspective view of a portion of the control system of the airplane shown in Fig. 1, and Fig. 3 is a part section of the stabilizer and elevators, and the remainder of the system shown in Fig. 2.

In Fig. 1, an airplane is shown comprising a fuselage 1, a chassis 2, a tail skid 3, a set of wings 4, whose chords have a fixed angle to the thrust axis of fuselage 1, a propeller 5, driven by a suitable source of power, a vertical fin 6, a rudder 7, elevators 8, mounted on a shaft 11, through the agency of which they are actuated as will appear later, a horizontal stabilizer 9, whose chord is adjustable in its angular relation to the thrust axis of fuselage 1, said stabilizer being shown also in an alternative position at 9a, its rear edge being articulated upon the elevator shaft 11, and its front edge being continuous across the fuselage 1, and running through slot 10 in the fuselage 1, where an actuating mechanism to be described later is located. The wings 4 are provided with ailerons 12, 12 (see also Fig. 2), hung on suitable hinges 18, 18, 18, 18, and actuated by horns 13, 15, whose movements are controlled by push-pull rods 14, 16, operated by cranks 19, 19, hung on countershaft 20, supported by hinge brackets 21, 21, suitably mounted in the wing structure. A crank 22 turns countershaft 20 by motion obtained from link 17, articulated upon pin 23. The opposite end of link 17 is forked, and provided with pin 24, adapted to receive vertical movements from arcuate, variable ratio slotted lever 25, of which one end is fulcrumed upon bracket 26, mounted on a suitable portion of the fuselage 1. The arc of lever 25 has the axis of pin 23 for its center and a radius equal to the distance between the axes of pins 23 and 24. The ratio of lever 25 is determined by the position of pin 24, as it swings about pin 23 as a center, actuated by link 42. A walking beam 40 is constructed to swing upon pin 41, secured to a suitable rigid member of the fuselage 1, and to be positioned by threaded rod 46, operated by rotational movements of hand wheel 48, supported by a bracket 47, secured to a suitable member of fuselage 1. The rear extremity of link 42 is articulated about a suitable pin in the uppermost portion of walking beam 40. In the portion of walking beam 40 below its support pin 41, a push-pull rod 45 is articulated. The rear end of rod 45 operates a bell crank 49, mounted by a bracket 50 on a suitable portion of the tail of fuselage 1. A link 51 picks up motions imparted to bell crank 49 and converts them into angular adjustments of horizontal stabilizer 9, by means of raising and lowering its leading edge, whereas its rear edge is hingedly supported by suitable means not shown upon shaft 11, integral with the elevator 8, and hingedly supported on a suitable portion of the fuselage, as for example on tail post 48. The protruding extremities of rod 45, various pins and push-pull rod 44 are shown as secured by pins 52, 52, 52, but may be held by nuts or any other suitable devices. Elevators 8, are actuated through the agency of shaft 11 by horn 54, which is moved by push-pull rod 44, articulated upon lug 43, integral with stick 32, the lower end of which is pivoted on pin 34 secured to lugs 35 of hollow spindle 28. Inside the bore of spindle 28 is a plug 36 with an end lug 37, by which link 38 slides said plug 36 under the influence of rocking movements of walking beam 40. The bent end of link 38 is shown as being retained in the hole in walking beam 40 by pin 39. The ends of plug 36 are cut in the form of opposing inclined surfaces $36^a$ and $36^b$, such that when approaching a limit of the travel of plug 36, one of said inclined surfaces will act as a stop for fore and aft movements of stick 32, by means of the lug $33^a$ on stick 32 contacting with surface $36^a$ or lug $33^b$ contacting with surface $36^b$. When in intermediate locations in its travel, plug 36 is so constructed that its cut away portion permits free swinging in a fore and aft direction of stick 32, lugs $33^a$ and $33^b$ failing to contact with any portion of plug 36 within the limits of full operation up and down of elevator 8. Hollow spindle 28 is rockingly supported at its ends by bearing brackets 29, 29, secured to a suitable portion of fuselage 1, and its forward end is provided with a crank 27 and a thrust collar 30, the crank and thrust collar coacting to permit of free rocking movements of spindle 28, but restraining it against axial movements. A push-pull rod 26' converts swinging movements of crank 27 into swinging movements of arcuate lever 25.

The operation of this system is simple. Adjustments of hand wheel 48 rock walking beam 40, and through the linkage described above adjust the horizontal stabilizer 9 and at the same time set the stops $36^a$ and $36^b$, thereby determining the extent of fore and aft movements of stick 32 and consequently of elevator 8. Also, the position of adjustment of walking beam 40 determines, through link 42, the position of pin 24 in arcuate lever 25, and thereby the ratio of the aileron mechanism. Thus, if the hand wheel 48 is adjusted to pull the upper end of walking beam 40 forward, push-pull rod 45 moves back, increasing the angle of attack of stabilizer 9, and trimming the airplane for low angle of attack or high speed. This forward setting of the upper portion of walking beam 40 also places pin 24 of link 17 near the fulcrum of arcuate lever 25, limiting the travel of link 17 and consequently of ailerons 12, 12. Lever 25 being of arcuate form with pin 23 as a center, adjustments of link 42 with the ailerons in their neutral position, do not cause movements of the ailerons resulting from ratio adjustments of link 42. The final result of the forward placement of the upper portion of walking beam 40 is to pull plug 36 back, so that lug $33^b$, operating through hole $31^b$ will contact with surface $36^b$ if forward movements of stick 32 be attempted, thereby preventing elevator 8 from being set for diving when the trim is for low angle of attack.

Similarly, it will be seen that the converse is true by virtue of the mechanism above described, or if the stabilizer be set to trim the airplane at high angle of attack, lug 33ª, operating through hole 31ª will contact with surface 36ª, preventing the elevators from stalling the airplane, while at the same time, the ratio of the aileron operating mechanism, determined by the position of pin 24 in lever 25, will be at its larger value. Intermediate positions of the parts produce graded results as will be clear without further description.

While the foregoing represents a preferred embodiment as applied to a particular design of airplane, modifications to suit particular types of airplanes are contemplated and the spirit rather than the exact detail construction should be understood to constitute this invention.

Having described our invention, what we claim is:

1. In an airplane, wings whose chords have a fixed angle to the thrust axis, a stabilizer whose chord has an adjustably variable angle to the thrust axis, elevators, variable stops for the elevators, ailerons, operating means for the ailerons including a variable ratio device, and means for simultaneously adjusting said stabilizer, varying said stops, and setting the ratio of said variable ratio device.

2. In an airplane, an adjustable horizontal stabilizer, elevators, operating mechanism for said elevators, adjustable stops for said mechanism to limit the movements of said elevators, adjusting means for said stabilizer, and means actuated by said adjusting means for adjusting said stops.

3. In an airplane, an adjustable horizontal stabilizer, an elevator, operating mechanism for said elevator, an adjustable stop for said mechanism to limit the upward movement of said elevator, adjusting means for said stabilizer, and means actuated by said adjusting means for adjusting said stop.

4. In an airplane, an adjustable horizontal stabilizer, an elevator, operating mechanism for said elevator, an adjustable stop for said mechanism to limit the downward movement of said elevator, adjusting means for said stabilizer, and means actuated by said adjusting means for adjusting said stop.

5. In an airplane, an adjustable horizontal stabilizer, ailerons, operating means for said ailerons including a veriable ratio device, adjusting means for said stabilizer, and means actuated by the adjusting means to vary the ratio of the device.

6. In an airplane having a roll control system and an adjustable horizontal stabilizer, an adjusting mechanism for said horizontal stabilizer, and an operating means for said roll control system including a variable ratio device whose ratio is adjusted by said mechanism.

7. In an airplane having a speed adjusting means, a roll control means and elevators, a variable ratio device in said roll control means, and an operating mechanism for said elevators including variable stops, the ratio of said device and the positions of said stops being adjusted by adjustments of said speed adjusting means.

8. In an airplane having speed adjusting means and roll control means, a limiting device in said roll control means adjusted by said speed adjusting means.

9. In an airplane having speed adjusting means, an elevator, and operating mechanism for said elevator, a limiting device in said operating mechanism adjusted by said speed adjusting means.

In testimony whereof, we have affixed our signatures.

HANNIBAL C. FORD.
JOHN McK. BALLOU.
VERNON W. BALZER.